United States Patent [19]
Mori et al.

[11] 4,232,202
[45] Nov. 4, 1980

[54] RECORD PLAYER FOR A STATIONARY RECORD DISC

[75] Inventors: Yoshihisa Mori; Norio Mashimo; Takeo Eguchi, all of Tokyo, Japan

[73] Assignee: Sony Corporation, Tokyo, Japan

[21] Appl. No.: 942,269

[22] Filed: Sep. 14, 1978

[30] Foreign Application Priority Data

Sep. 19, 1977 [JP] Japan ............................ 52-112486

[51] Int. Cl.³ .............................................. G11B 3/40
[52] U.S. Cl. ............................ 179/100.4 E; 274/9 C; 179/100.4 R; 179/100.1 S; 179/100.1 R
[58] Field of Search ................. 274/9 C, 23 A, 13 A; 179/100.1 C, 100.1 R, 100.1 S, 100.4 E, 100.4 A, 100.4 R; 360/117

[56] References Cited

U.S. PATENT DOCUMENTS

| | | | |
|---|---|---|---|
| 2,851,539 | 9/1958 | Brown | 179/100.1 C |
| 2,862,716 | 12/1958 | Marks | 274/23 A |
| 3,181,870 | 5/1965 | Lasswell | 274/9 C |
| 3,360,269 | 12/1967 | Dunn | 274/9 C |
| 3,362,716 | 1/1968 | Dunn | 179/100.1 S |
| 3,420,967 | 1/1969 | Goldmark | 179/100.4 C |
| 3,482,841 | 12/1969 | Doring | 274/9 C |

OTHER PUBLICATIONS

"Lirpa, 'VDRS', Vehicular Disc Reproducton", by I. Lirpa, Audio, Apr. 1978, pp. 73-80.

*Primary Examiner*—James W. Moffitt
*Assistant Examiner*—Alan Faber
*Attorney, Agent, or Firm*—Lewis H. Eslinger; Alvin Sinderbrand

[57] ABSTRACT

A record player for use with a stationary conventional record disc having a sprial sound groove with signals recorded therein includes a movable body which is placed on the record disc, a drive assembly for causing the movable body to travel over the record disc, a pickup or cartridge pivotally mounted at the underside of the movable body for engaging the sound groove and reproducing the signals recorded therein while tracking the spiral sound groove as the movable body travels on the record disc, and an arrangement for controlling the travel on the movable body relative to the record disc in response to pivotal movement of the pick-up.

14 Claims, 5 Drawing Figures

RECORD PLAYER FOR A STATIONARY RECORD DISC

BACKGROUND OF THE INVENTION

1. Field of the Invention

This invention relates generally to a record player, and more specifically is directed to a record player in which the pick-up is carried by a movable body which travels around a stationary record disc.

2. Description of the Prior Art

Conventional record players ordinarily include a motor driven turntable on which a phonograph record disc is rotated. By placing the stylus of a pick-up or cartridge on the rotating record disc, signals are picked up from the latter and, after suitable amplification, may issue as audible sounds from a loudspeaker. However, such conventional record player is complex in construction and rather large. Thus, in its present form, the conventional record player is difficult to miniaturize.

Record players without rotating turntables have also been proposed in which a cartridge, a loudspeaker, an amplifier, and the like are assembled into a movable body which turns on a stationary record disc to reproduce the signals recorded thereon. However, a problem with these devices is that they require specially constructed phonograph record discs which are each provided with a spiral sound groove formed between a pair of guide rails on the record for guiding the movable body in its movements relative to the record disc. Providing each record disc with such guide rails obviously increases the cost thereof. Furthermore, it is impossible to use the record playing device on a conventional record disc which lacks the guide rails.

OBJECTS AND SUMMARY OF THE INVENTION

Accordingly, it is an object of the invention to provide a record player which overcomes the mentioned defects of conventional record players.

More specifically, it is an object of the invention to provide a record player that can accurately reproduce sound signals on a conventional record disc.

Another object of the invention is to provide a record player that is both compact and simple to operate.

A further object of the invention is to provide a record player, as aforesaid, which does not require a rotating turntable.

A still further object of the invention is to provide a record player having a movable body which can be made to travel on a conventional record disc so as to cause a pick-up or cartridge carried by the body to reproduce signals recorded in a spiral groove on the disc.

In accordance with an aspect of the invention, a record player utilized with a stationary conventional record disc having a spiral sound groove includes a movable body placed on the record disc, means for driving the movable body relative to the disc, a pick-up pivotally mounted under the movable body for engaging and tracking the spiral sound groove of the record and reproducing signals recorded therein, and means for controlling the travel, that is, the direction and/or speed of movement of the movable body in response to pivotal motion of the pick-up relative thereto.

The above, and other objects, advantages and features of the present invention, will be apparent in the following detailed description of certain preferred embodiments when read with the accompanying drawings.

DESCRIPTION OF A PREFERRED EMBODIMENT

Figure 1:
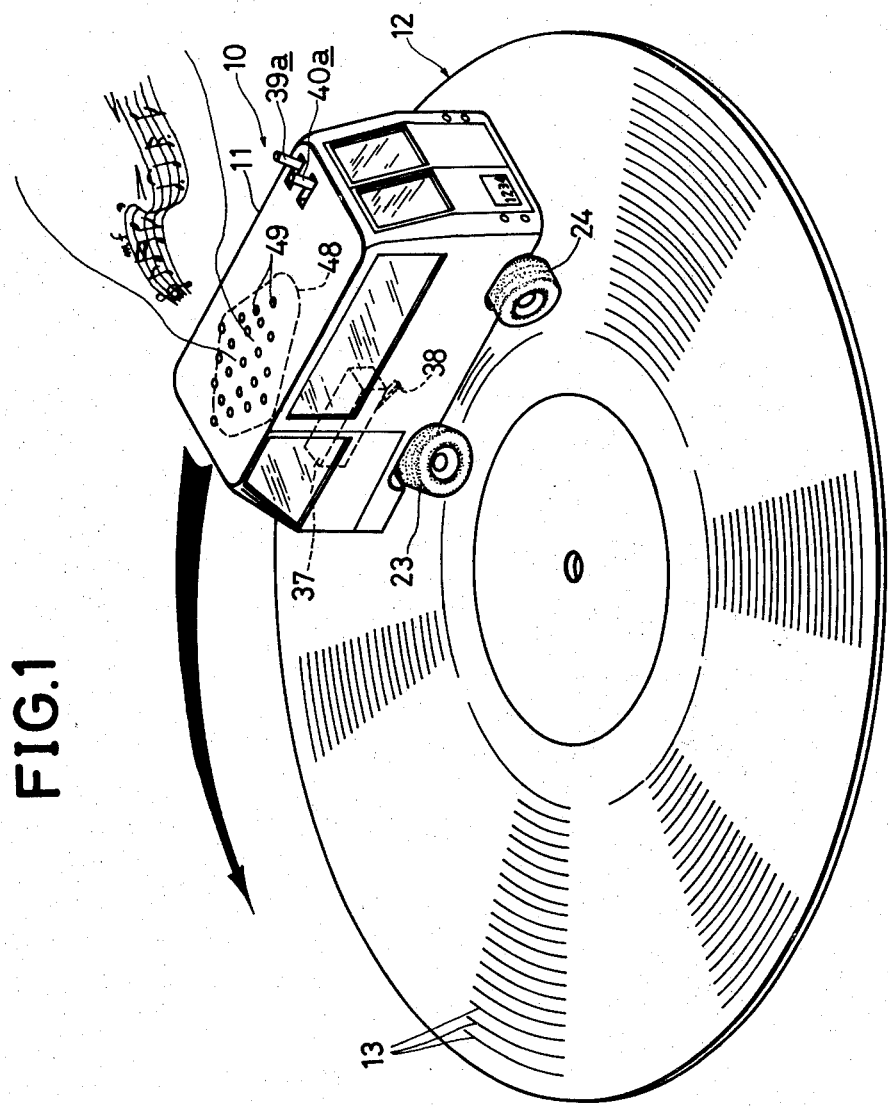
FIG. 1 is a perspective view of a record player according to an embodiment of the invention, and which illustrates the record player in operation.
Figure 2:
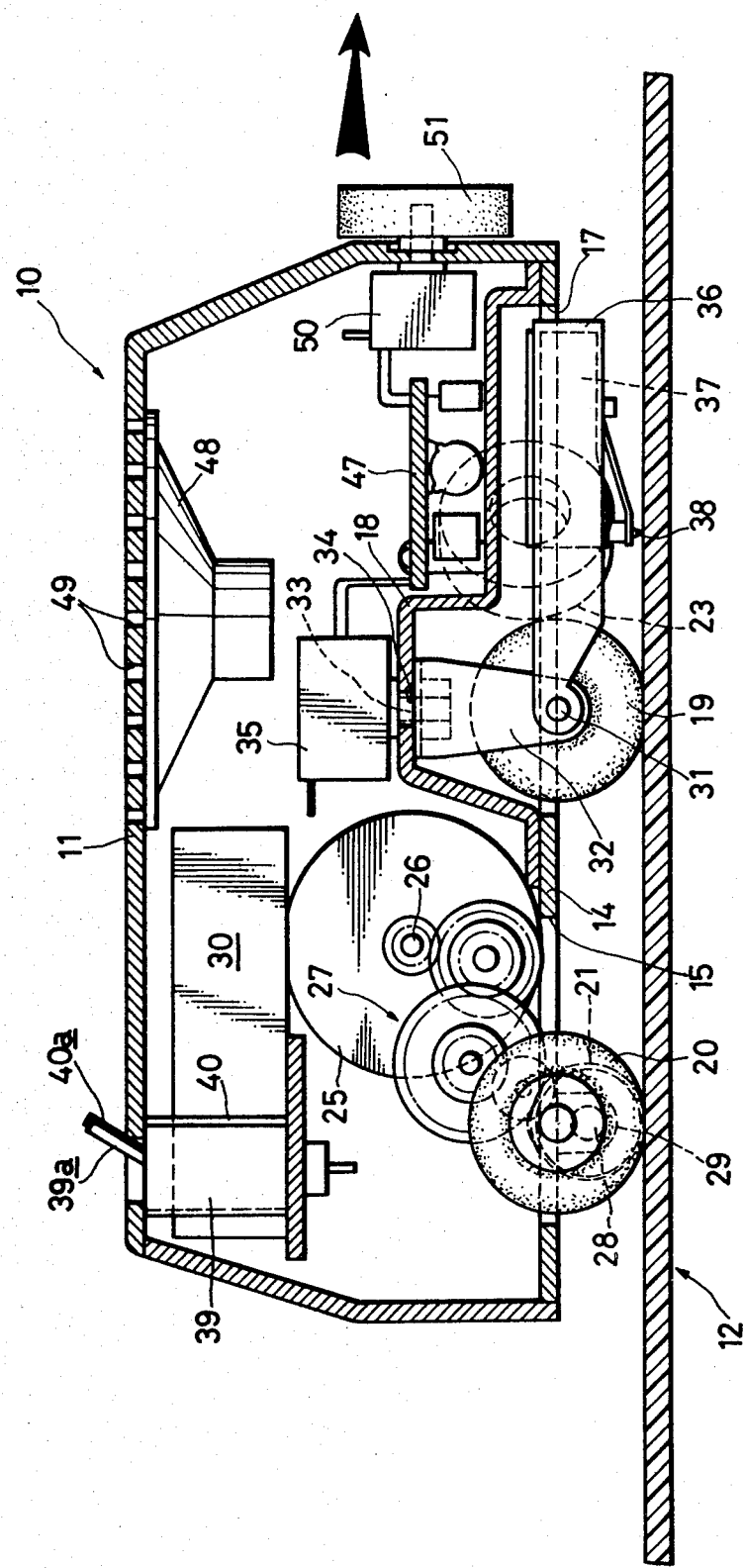
FIG. 2 is an enlarged, longitudinal sectional view of the record player.
Figure 3:
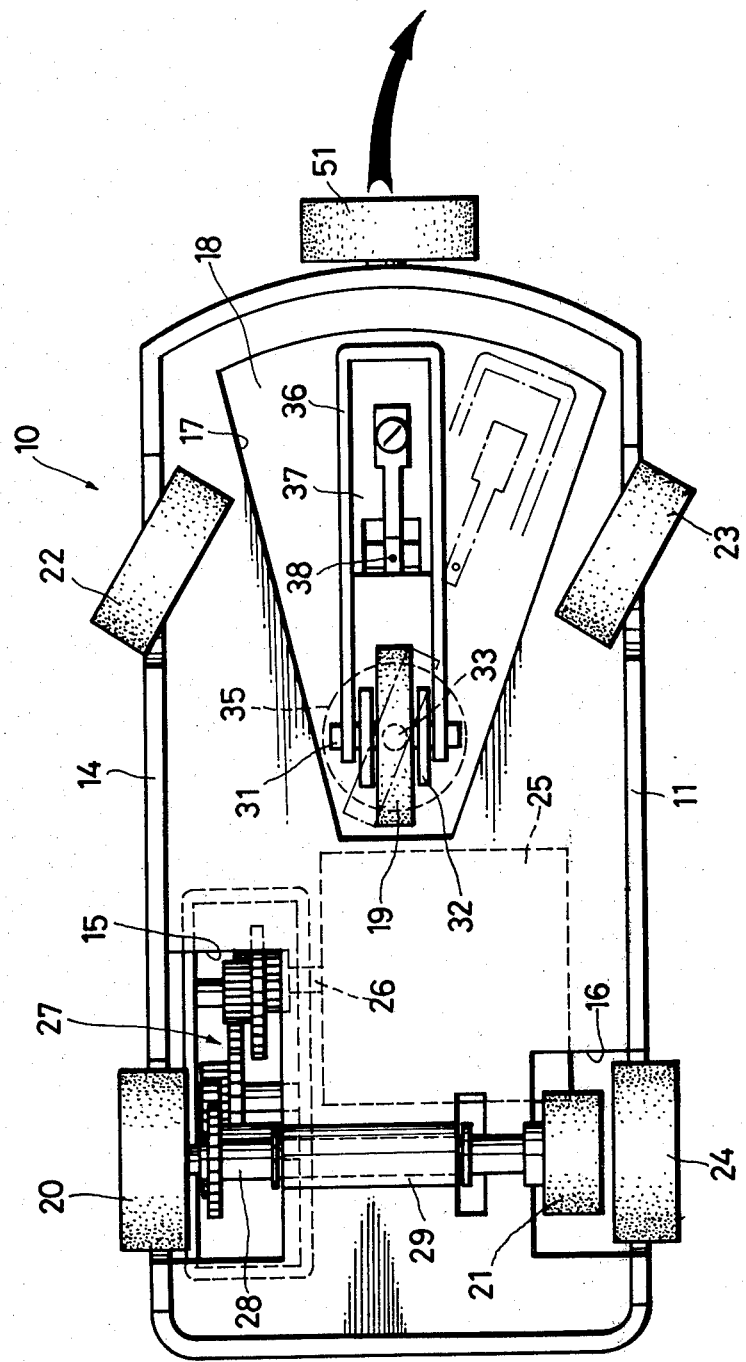
FIG. 3 is an enlarged bottom view of the record player.

Referring to the drawings in detail, and initially to FIGS. 1-3 thereof, it will be seen that a record player 10 according to this invention generally comprises a movable body 11, shown in the form of a toy bus or van, which is adapted to be placed on a conventional phonograph record disc 12 having a spiral groove 13 at least in its upper surface in which sound or audio signals are recorded. The body 11 has a base or chassis 14 (FIGS. 2 and 3) at the bottom thereof, and such chassis is formed with cutouts 15 and 16 at the opposite sides of its rear portion and a fan-shaped cutout 17 which is laterally centered in respect to the forward portion of the chassis (FIG. 3). A raised frame 18 extends over cutout 17 (FIG. 2) and is suitably secured to chassis 14.

The body 11 is supported for rolling movement over the upper surface of record disc 12 by means of a steerable guide wheel 19 which is laterally centered under the forward portion of body 11, a rear wheel 20 disposed at one side of body 11 and a drive wheel 21 disposed adjacent the opposite side of body 11 also at the rear portion of the latter. In addition to the foregoing operative wheels 19, 20 and 21 which are intended to make rolling contact with the upper surface of record disc 12, body 11 of record player 10 is provided with front wheel simulations 22 and 23 at opposite sides of the front portion of body 11 and a rear wheel simulation 24 disposed laterally outside of drive wheel 21 at the side of body 11 remote from rear wheel 20. The front wheel simulations 22 and 23 and the rear wheel simulation 24 are dimensioned and positioned so as to be inoperative or raised from the upper surface of record disc 12 when wheels 19, 20 and 21 are in rolling engagement therewith.

In order to drive body 11 of record player 10 along the surface of record disc 12, an electric motor 25 is suitably mounted within body 11 on chassis 14 and has its motor shaft 26 connected by way of a gear transmission 27 with one end portion of a shaft 28 which extends laterally under the rear portion of chassis 14 in a sleeve bearing 29. The drive wheel 21 is secured to the end of shaft 28 remote from the gear transmission 27. A battery or batteries 30 mounted above motor 25 in body 11 (FIG. 2) supplies the power for driving motor 25, as hereinafter described in detail. Thus, it will be seen that body 11 is driven by the rotation of drive wheel 21 which is at the side of body 11 facing toward the center of the record disc 12 when placed on the latter. The rear wheel 20 is suitably mounted on body 11 so as to be freely rotatable by reason of its rolling contact with the record disc when body 11 is made to move by drive wheel 21.

The guide wheel 19 is also freely rotatable on an axle 31 which extends horizontally and has its opposite end portions mounted in the opposite sides of a yoke or mounting bracket 32. The mounting bracket 32 is suitably mounted under raised frame 18 for turning about a vertical axis, that is, an axis perpendicular to the surface of record disc 12. For example, in the illustrated preferred embodiment of the invention, mounting bracket 32 is secured, as by a set screw (not shown), on a vertical shaft 33 which extends downwardly through a hole 34 in frame 18 from a potentiometer or variable resistor 35 secured on frame 18 and having its resistance value varied in response to turning of shaft 33 with yoke or mounting bracket 32. A cartridge support arm or frame 36 extends forwardly from bracket 32 below raised frame 18, and the back end of frame 36 is pivotally mounted on the ends of axle 31 so that cartridge support arm or frame 36 is mounted for pivoting about a horizontal axis parallel to the surface of record disc 12. A cartridge or pick-up 37 is suitably mounted in frame 36 ahead of axle 31 and has a stylus 38 depending therefrom. Naturally, the action of gravity on frame 36 and cartridge 37 therein tends to pivot frame 36 downwardly about the axis of axle 31 so that stylus 38 is urged into engagement with the upper surface of record disc 12 for tracking the spiral groove 13 and reproducing the signals recorded therein as movable body 11 is driven around the record disc. As hereinafter described in greater detail, due to the positioning of stylus 38 ahead of guide wheel 19, the tracking of stylus 38 in spiral groove 13 will cause suitable turning of cartridge supporting frame 36 and mounting bracket 32 about the vertical axis of shaft 33 so as to ensure that guide wheel 19 makes the driven body 11 follow a spiral path corresponding to the spiral groove 13.

Figure 5:
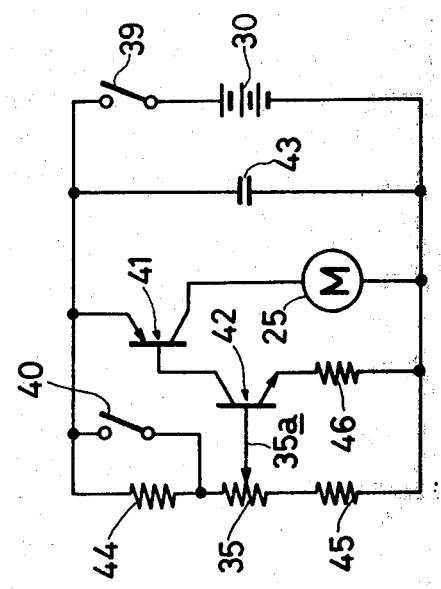
FIG. 5 is a circuit diagram of a control circuit for the record player.

Referring now to FIG. 5, it will be seen that a speed control circuit for motor 25 includes, in addition to battery 30 and variable resistor 35, an on-off switch 39, a speed-selecting switch 40, a PNP-type transistor 41, an NPN-type transistor 42, a capacitor 43 and resistors 44, 45 and 46. The transistors 41 and 42, capacitor 43 and resistors 44-46 may be provided on a printed circuit board 47 mounted within body 11 above frame 18 and having suitable electrical connections to battery 30, motor 25 and variable resistor 35, as well as to switches 39 and 40 which are also mounted in body 11 and have switch actuators 39a and 40a, respectively, extending out of the body for operation by the user of record player 10. Circuit board 47 may also carry the usual amplifier circuits or the like by which signals reproduced by cartridge or pick-up 37 are suitably amplified to drive a loudspeaker 48 mounted against the top of body 11 for emitting audible sounds or music through perforations 49 therein (FIG. 1). The loudness of the reproduced sounds may be controlled, as is usual, by a variable resistor 50 (FIG. 2) which is adjustable by manual actuation of a knob 51 simulating a spare tire or wheel at the front of body 11.

Referring again to FIG. 5, it will be seen that the emitter of transistor 41 is connected through on-off switch 39 with the positive side of battery 30, while the collector of transistor 41 is connected through motor 25 to the negative side of the battery. Capacitor 43 is connected across switch 39 and battery 30 and the base of transistor 41 is connected to the collector of transistor 42 which has its emitter connected through resistor 46 to the negative side of battery 30. The base of transistor 42 is connected to a movable tap 35a of variable resistor 35 which is connected between resistors 44 and 45 for forming a voltage divider with the latter. Finally, speed-selecting switch 40 is shown to be connected in parallel with resistor 44 so as to shunt or by-pass the latter when switch 40 is closed. It will be appreciated that tap 35a of variable resistor 35 is moved along the resistance element of the latter in response to turning of shaft 33 with mounting bracket 32.

Figure 4:
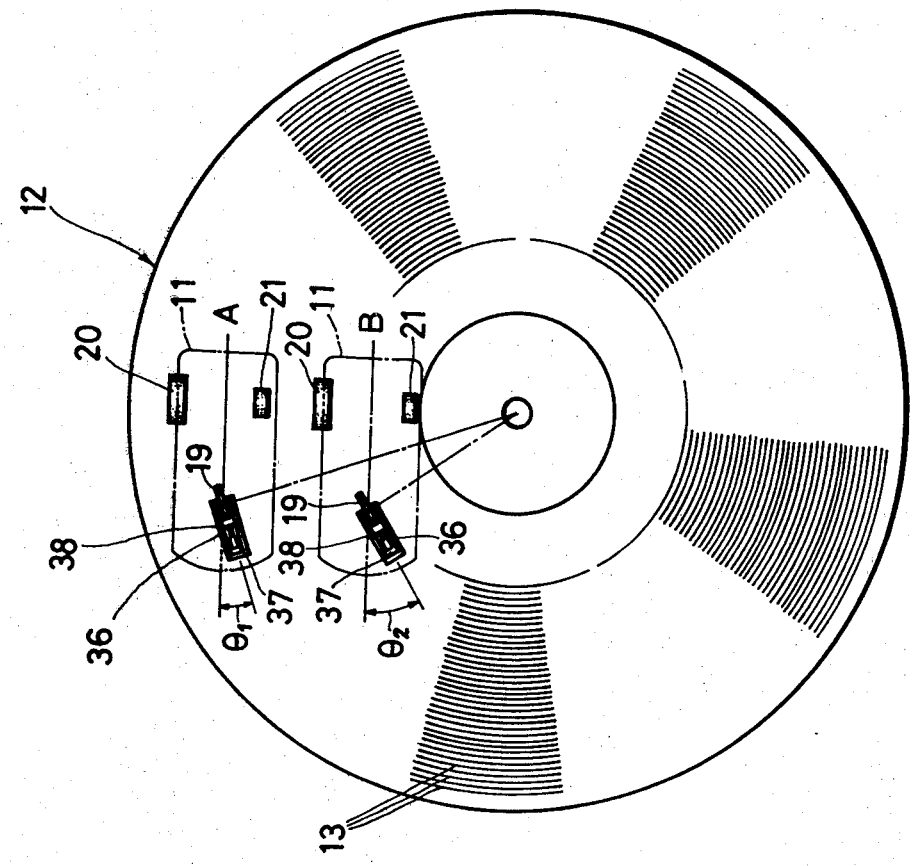
FIG. 4 is a schematic plan view of a record disc to which reference will be made in explaining the operation of the record player.

The above described record player 10 according to this invention operates as follows:

Initially, the user places movable body 11 on the stationary record disc 12 at any desired location where a playback or reproducing operation is to be started, for example, as the position A on FIG. 4 which is at a relatively large radial distance from the center of disc 12. After the stylus 38 of cartridge 37 has been engaged with spiral groove 13, and after speed-selecting switch 40 has been opened or closed so as to select speeds of movement of body 11 suitable for playing the record disc 12, for example, at 33⅓ or 45 rpm, respectively, switch 39 is closed or turned ON so as to initiate operation of motor 25. Upon such operation of motor 25, the rotation of its shaft 26 is transmitted through gear transmission 27 to shaft 28 and thence to drive wheel 21 for driving body 11 in a counterclockwise direction around record 12, as viewed on FIG. 4. With such movement of body 11, the corresponding movement of stylus 38 along groove 13 causes reproduction by cartridge 37 of the sound or audio signals recorded in the groove, whereupon the reproduced signals are amplified and applied to loudspeaker 48 to provide audible sounds, the volume of which is controlled by adjustment of knob 51.

It will be appreciated that the engagement of stylus 38 in groove 13 also serves to steer body 11 in its movement around record disc 12. More particularly, as movable body 11 is driven around record disc 12, the assembly constituted by cartridge supporting frame 36, mounting bracket 32 and guide wheel 19 is turned about the vertical axis of shaft 33 so as to maintain coincidence between a tangent to spiral groove 13 at the point of its engagement by stylus 38 with a line extending from such stylus through the axis of shaft 33. Thus, as stylus 38 engages inwardly successive turns of spiral groove 13, which turns have progressively decreasing radii of curvature, the assembly of frame 36, mounting bracket 32 and guide wheel 19 is progressively turned around the vertical axis of shaft 33, for example, from a position at an angle $\theta_1$ in respect to the longitudinal axis of body 11 when the latter is disposed at A, to a position at an angle $\theta_2$ in respect to the longitudinal axis of body 11 when the latter is disposed at B on FIG. 4. Accordingly, as body 11 is driven around record disc 12, guide wheel 19 is gradually turned about the vertical axis of shaft 33 so as to progressively decrease the radius of curvature of the path followed by movable body 11 in correspondence to the progressively decreasing radii of curvature of the successive turns of groove 13.

Since phonograph record disc 12 is of conventional manufacture, it will be appreciated that the sound or audio signals recorded in its groove 13 are intended to be played back or reproduced during relative movement of the stylus and record disc at a constant angular or rotational speed, for example, at 33⅓ or 45 rpm. However, such constant angular or rotational speed of the stylus relative to the record disc requires that the relative linear speed be greater when the stylus engages an outer turn of the spiral groove than when the stylus engages a radially inner turn of the spiral groove. Thus, in the record player 10 according to this invention, turning of the assembly of cartridge supporting frame 36, mounting bracket 32 and guide wheel 19 about the vertical axis of shaft 33, for example, from the position defined by the angle $\theta_1$ to the position defined by the angle $\theta_1$ on FIG. 4 in response to the movement of body 11 from the outer position A to the inner position B, causes corresponding turning of shaft 33 of variable resistor 35. Such turning of shaft 33 causes downward movement of the tap 35a of variable resistor 35, as viewed on FIG. 5, so that the base voltage applied to transistor 42 is decreased and results in a corresponding decrease in the supply of current through transistor 41 to motor 25. By reason of the foregoing, the speed of movement of body 11 is progressively decreased as the latter moves along the inwardly successive turns of groove 13.

From the above it will be apparent that the movement of the body 11 over the disc 12 is controlled, both as to its direction and speed, in response to movement of cartridge 37 and stylus 38 relative to body 11 in the horizontal direction, that is, parallel to the plane of record disc 12.

It will further be appreciated in respect to FIG. 5, that closing of switch 40 for bypassing or shunting resistor 44 increases the level of the potentials applied to the base of transistor 42 apart from the variation of such potentials resulting from movement of tap 35a, whereby motor 25 is driven at relatively high speeds, for example, suitable for obtaining movement of body 11 around record disc 12 at 45 rpm. On the other hand, when switch 40 is opened so as to place resistor 44 in series with variable resistor 35 and resistor 45, the varying potentials applied to the base of transistor 42 are correspondingly lowered with the result that motor 25 is rotated at speeds suitable for causing body 11 to move around record disc 12 at 33⅓ rpm.

Although the record player 10 described above with reference to the drawings has loudspeaker 48 and the amplifier and any other circuits required for obtaining audible sounds from the signals reproduced by cartridge 37 all contained in movable body 11, a record player according to this invention may have a transmitter within movable body 11 by which the recorded signals, after being reproduced by cartridge 37 and modulated, are transmitted to an external receiver. In such external receiver, which may be stationary, the received modulated signals are demodulated and then supplied to a loudspeaker for emission from the latter as audible sounds. The foregoing arrangement makes it possible to reduce the size of movable body 11 by removing therefrom relatively bulky components, such as, the loudspeaker.

In the illustrated record player 10, the simulated spare wheel or tire 51 is used as the knob for adjusting variable resistor 50 and thereby controlling the volume of the reproduced sounds. However, if desired, such function of knob 51 could be performed by either one of the simulated front wheels 22 and 23 or the simulated rear wheel 24.

As previously mentioned, in the illustrated embodiment of the invention, both the direction of movement and the speed of movement of body 11 on record disc 12 are controlled in response to movements of stylus 38 and cartridge 37 in the horizontal direction relative to body 11. However, it is not necessary that both the direction and speed of movement of body 11 be thus controlled. For example, if desired, only the direction of movement of body 11 may be controlled in response to horizontal movements of the stylus and cartridge, while the speed of movement is otherwise controlled or reduced with travel of body 11 along inwardly successive turns of spiral groove 13. In the latter case, a timer may be provided to generate signals at intervals from the commencement of the playback or reproducing operation, and such signals may be supplied to a speed control circuit which progressively reduces the speed of movement of body 11 in response to the successive signals.

Although an illustrative embodiment of the invention and a number of modifications thereof have been specifically described herein, it is to be understood that the invention is not limited to that precise embodiment or the specifically mentioned modifications, and that a person skilled in the art may effect various changes and other modifications therein without departing from the scope or spirit of the invention as defined in the appended claims.

What is claimed is:

1. A record player for use on a stationary record disc having a surface on which signals are recorded in a spiral sound groove comprising
   a freely movable body adapted to be steerably supported on said surface of the record disc for random movement in respect to the latter;
   drive means operatively associated with said randomly movable body for propelling said movable body relative to the record disc;
   sound pick-up means for engaging and tracking the spiral sound groove of said record disc and reproducing the signals recorded therein as said movable body is propelled;
   means mounting said sound pick-up means in respect to said movable body for movement in a plane substantially parallel to the plane of the surface of said record disc; and
   control means for steering said movable body and thereby controlling the direction of movement of said movable body on said record disc in response to movement of said sound pick-up means relative to said movable body while engaging and tracking the spiral groove on said record disc.

2. A record player according to claim 1; further comprising speed controlling means operatively associated with said movable body for controlling the speed of movement of the movable body on said record disc.

3. A record player according to claim 2; wherein said speed controlling means is responsive to said movement of said sound pick-up means relative to said movable body while engaging and tracking the spiral groove on said record disc.

4. A record player according to claim 1; wherein said control means includes a mounting bracket pivotally coupled to said movable body for movement around an axis substantially perpendicular to said plane of said surface of the record disc, and wheel means rotatably mounted in said mounting bracket for rolling on said record disc and guiding said movable body.

5. A record player according to claim 4; wherein said sound pick-up means includes
   a cartridge with stylus means depending therefrom for engaging and tracking the spiral sound groove of said record disc, a supporting frame having first and second ends, said first end having the cartridge mounted thereon, said second end being coupled to said mounting bracket of said control means for pivoting movement relative to said bracket in a plane substantially perpendicular to said record disc surface.

6. A record player according to claim 5; wherein said drive means includes an electrically driven motor and speed controlling means including variable resistor means connected to said electrically driven motor for gradually reducing the speed of said motor in response to pivoting of said mounting bracket.

7. A record player according to claim 6; wherein said variable resistor means includes a shaft which is turnable for varying the resistance of said variable resistor means, said shaft being coupled for pivotal movement around its longitudinal axis with said mounting bracket.

8. A record player according to claim 5; wherein said driving means includes an electrically driven motor and speed controlling means having switch means operatively associated with said electrically driven motor for selectively driving said movable body at one of two predetermined speeds.

9. A record player according to claim 8; wherein said speed controlling means includes resistor means operatively connected to said electrically driven motor for reducing the speed of said electrically driven motor and switch means connected between said resistor means and said electrically driven motor for selectively connecting and disconnecting said resistor means in respect to said electrically driven motor.

10. A record player according to claim 8; wherein said speed control means further includes variable resistor means connected to said electrically driven motor for gradually reducing the speed of said motor, shaft means turnable for varying the resistance of said variable resistor means; said shaft means being fixed to said mounting bracket for pivoting with the latter and forming the means by which said mounting bracket is coupled to said movable body.

11. A record player for use with a stationary record disc having signals recorded in a spiral groove in a surface of the disc; said record player comprising
   a freely movable body adapted to be steerably supported on said surface of the record disc for random movement in respect to the latter;
   drive means for propelling said body over said record disc;
   pick-up means depending from said body for engaging and tracking said spiral groove and reproducing the signals recorded in the latter;
   means mounting said pick-up means for movement relative to said body in a plane parallel to said surface of the record disc; and
   control means responsive to said movement of said pick-up means relative to said body for steering said movable body and thereby controlling the direction of said random movement of said body over said disc and for varying the speed of said movement of the body over said disc.

12. A record player according to claim 11; in which said means for steering said body includes a steerable wheel, and means interconnecting said pick-up means with said steerable wheel for progressively turning the latter in the direction decreasing the turning radius of said body as said pick-up means tracks said spiral groove.

13. A record player according to claim 12; in which said drive means includes an electric motor and a circuit for energizing the latter; and said means for varying the speed of movement of the body includes a variable resistor interposed in said circuit, and means responsive to said movement of the pick-up means for changing the resistance value of said variable resistor.

14. A record player according to claim 11; in which said drive means includes an electric motor and a circuit for energizing the latter; and said means for varying the speed of movement of the body includes a variable resistor interposed in said circuit, and means responsive to said movement of the pick-up means for changing the resistance value of said variable resistor.

* * * * *